United States Patent
Imboden

(10) Patent No.: US 12,283,867 B1
(45) Date of Patent: Apr. 22, 2025

(54) SUPER-COOLED PROPELLANT POWERED GENERATOR SYSTEM

(71) Applicant: John Imboden, Olive Branch, MS (US)

(72) Inventor: John Imboden, Olive Branch, MS (US)

(*) Notice: Subject to any disclaimer, the term of this patent is extended or adjusted under 35 U.S.C. 154(b) by 240 days.

(21) Appl. No.: 17/833,773

(22) Filed: Jun. 6, 2022

Related U.S. Application Data

(60) Provisional application No. 63/197,201, filed on Jun. 4, 2021.

(51) Int. Cl.
*H02K 9/19* (2006.01)
*F01D 15/10* (2006.01)
*H02K 55/02* (2006.01)

(52) U.S. Cl.
CPC ............. *H02K 55/02* (2013.01); *F01D 15/10* (2013.01); *H02K 9/19* (2013.01); *F05D 2220/768* (2013.01)

(58) Field of Classification Search
CPC .......... H02K 55/02; H02K 9/19; F01D 15/10; F05D 2220/768
See application file for complete search history.

(56) References Cited

U.S. PATENT DOCUMENTS

| | | | |
|---|---|---|---|
| 5,011,821 A | 4/1991 | McCullough | |
| 5,430,009 A | 7/1995 | Wang | |
| 5,482,919 A | 1/1996 | Joshi | |
| 5,841,211 A | 11/1998 | Boyes | |
| 6,489,701 B1 | 12/2002 | Gamble et al. | |
| 6,617,738 B2 | 9/2003 | Dickinson | |
| 6,897,577 B2 | 5/2005 | Weeber et al. | |
| 8,242,657 B2 | 8/2012 | Nakamura | |
| 8,401,599 B2 | 3/2013 | Vaucher et al. | |
| 9,190,893 B2 | 11/2015 | Fleck et al. | |
| 9,866,097 B2 | 1/2018 | Guina et al. | |
| 10,077,955 B2 | 9/2018 | Morrison | |
| 10,411,579 B2 | 9/2019 | Kitada | |
| 2002/0125787 A1* | 9/2002 | Howard | H02K 3/47 310/179 |
| 2007/0080595 A1 | 4/2007 | Akiyama et al. | |
| 2013/0252819 A1 | 9/2013 | Zakuskin | |
| 2015/0133303 A1 | 5/2015 | Gregory | |
| 2020/0169158 A1 | 5/2020 | Buhrer et al. | |
| 2023/0040452 A1* | 2/2023 | Renotte | H02K 9/08 |

* cited by examiner

*Primary Examiner* — Thomas Truong
(74) *Attorney, Agent, or Firm* — John Rizvi; John Rizvi, P.A.—The Patent Professor®

(57) ABSTRACT

A super-cooled propellant powered generator system which generates an amount of electrical energy and is driven by a super-cooled propellant includes first and second rotator support assemblies comprising first and second support units and guide members attached thereto, respectively. A rotator assembly includes a rotator unit disposed in a rotational relationship relative to the guide members, the rotator unit having one or more propulsion vanes mounted therein. A rotator magnet assembly includes at least a rotator magnet mounted around the rotator unit and rotational therewith. A stator assembly having a stator unit is disposed in an electrical generating orientation relative to the rotator magnet. A super-cooled propellant transmission assembly transmits super-cooled propellant to and through the support units and rotator unit into contact with the propulsion vanes thus rotating the rotator unit and rotator magnet mounted thereto relative to the stator unit, and generating the amount of electrical energy.

20 Claims, 6 Drawing Sheets

SUPER-COOLED PROPELLANT POWERED GENERATOR SYSTEM

CROSS-REFERENCE TO RELATED APPLICATIONS

This application claims the benefit of U.S. Provisional Patent Application Ser. No. 63/197,201 filed on Jun. 4, 2021, which is incorporated by reference herein in its entirety.

FIELD OF THE INVENTION

The present invention relates generally to a super-cooled propellant powered generator system.

BACKGROUND OF THE INVENTION

Despite its immensity relative to a single human being, with seemingly endless resources available across the continents and in the vast oceans which lie in between, the resources of the planet earth are limited and many are in present danger of being depleted as the world population continues to grow with no apparent end in sight. World population is currently estimated to be just under 8 billion people. This is nearly double what it was a mere 50 years ago, which was nearly double what it was a mere 40 years prior thereto. If this trend continues, and while not all models agree, the world population may double again in the next 40 to 50 years.

Every person, large and small, whether in the city or the country or the small towns scattered in between requires air to breathe, water to drink, and food to eat. Thus, every person, large and small, consumes an amount of the limited resources of the planet throughout his or her lifetime. Furthermore, each person generates a measurable amount waste as a result of their consumption, commonly referred to today as one's carbon footprint. When taken individually, human consumption appears de minimus relative to the vast resources of the planet. However, when viewed collectively, it becomes increasingly apparent that the present rate of human consumption is simply not sustainable.

Of course, human consumption is not limited to the bare essentials of air, water, and food. Modern civilization is increasingly dependent on electrically powered devices ranging in size from the tiniest battery powered devices to nuclear power warships. According to some estimates, worldwide energy consumption has also nearly doubled in the last 50 years. Perhaps more alarming, is the fact that roughly 80% of the energy generated worldwide today comes from fossil-based fuels such as oil, coal, shale, and natural gas. As the harmful and potentially irreversible impact of global consumption of fossil fuels become more apparent each day and evidenced by global warming, sea level rise, and acidification of our oceans, and despite years of denial in the face of mounting scientific evidence, governments worldwide are beginning to acknowledge the need for alternative and renewable energy sources.

Biofuels currently account for nearly 10% of the world's energy generation and consumption. While seemingly a greener solution then traditional fossil-based fuels, biofuels do not come without a cost. A primary concern of a biofuel based model is the competition for space and resources for the production of foodstuffs also needed to sustain the world population. Other disadvantages of biofuels include reliance on a monoculture of feedstocks, increased fertilizer use, which ends up in our streams and rivers and ultimately into our oceans, and increased water consumption itself, once again, competing with another basic resource needed to sustain the world population.

Nuclear energy currently accounts for about 5% of the world's energy consumption. While touted as a "clean" energy alternative, nearly 1,000 mile of land surrounding the site of the formerly active Chernobyl nuclear reactors remains uninhabitable, and some estimates indicate may remain uninhabitable for tens of thousands of years. While not as extensive, an exclusion zone remains around the site of Fukushima nuclear disaster which occurred more than 10 years ago, with many years of clean-up until humans may be permitted to return and inhabit the area.

Other "clean" energy generating systems such as solar, wind and hydroelectric have been implemented varied degrees of success throughout the world, however, to date, none appear to have proven to be an economically viable solution to the world's seemingly insatiable appetite for electricity. Further, these systems are reliant upon uncontrollable environmental conditions such as unobstructed sunshine and/or sustained winds.

Accordingly, there is an established need for a solution to one or more of the aforementioned deficiencies in the current state of the art. Specifically, there is an urgent need for a reliable system for generating electricity which is driven by feedstock which is abundantly available, non-polluting and reusable, and which operates any deficiencies not believed to be realize in present energy generating systems. Further, there is a need for such a reliable system for generating electricity which is readily scalable across personal, commercial, and/or municipal electricity generating systems.

SUMMARY OF THE INVENTION

The present invention is generally directed to a super-cooled propellant powered generator system to generate an amount of electrical energy.

In a first implementation of the invention, a super-cooled propellant powered generator for generating an amount of electrical energy driven by a super-cooled propellant may comprise: a first rotator support assembly having a first support unit with a first guide member attached thereto; a second rotator support assembly oppositely disposed from the first rotator support assembly having a second support unit with a second guide member attached thereto; a rotator assembly including a rotator unit disposed in a rotational relationship relative to the first guide member and the second guide member; the rotator unit having at least one propulsion vane mounted therein; a rotator magnet assembly having a rotator magnet mounted around the rotator unit and rotational therewith; a stator assembly comprising a stator unit, the rotator magnet disposed in an electrical generating orientation relative to the stator unit; and, a super-cooled propellant transmission assembly to transmit an amount of super-cooled propellant to at least the second support unit via a super-cooled propellant transmission line before discharging the amount of super-cooled propellant through the second guide member into the rotator unit and into contact with the at least one propulsion vane causing rotation of the rotator unit, and the rotator magnet mounted thereto, relative to the stator unit, thereby generating the amount of electrical energy.

In a second aspect, the super-cooled propellant powered generator system can include a first support unit having a first superconductive material of construction.

In another aspect, the super-cooled propellant powered generator system may have a rotator magnet assembly including a first magnet mounted proximate a first open end of a rotator unit.

In a further aspect, the super-cooled propellant powered generator system can include a super-cooled propellant transmission assembly to transmit an amount of super-cooled propellant through a first cooling coil in a first support unit to maintain a first superconductive material of construction of the first support unit at a first operating temperature before transmitting the super-cooled propellant to a second support unit.

In one other aspect, the super-cooled propellant powered generator system may have a first support unit with a first superconductive material of construction which exhibits a first magnetically repulsive force on a first magnet to repel a first open end of a rotator unit into a physically displaced orientation relative to a first rotator support assembly.

In yet another aspect, the super-cooled propellant powered generator system can include a second support unit having a second superconductive material of construction.

In still one further aspect, the super-cooled propellant powered generator system may have a rotator magnet assembly including a second magnet mounted proximate a second open end of a rotator unit.

In yet one other aspect, the super-cooled propellant powered generator system can include a super-cooled propellant transmission assembly to transmit an amount of super-cooled propellant through a second cooling coil in the second support unit to maintain the second superconductive material of construction of the second support unit at a second operating temperature before discharging the super-cooled propellant into the rotator unit into contact with the at least one propulsion vane.

In still another aspect, the super-cooled propellant powered generator system may have a second support unit with a second superconductive material of construction which exhibits a second magnetically repulsive force on a second magnet to repel a second open end of a rotator unit into a physically displaced orientation relative to a second rotator support assembly.

In yet one further aspect, the super-cooled propellant powered generator system can include a rotator unit having a plurality of propulsion vanes mounted therein and an amount of super-cooled propellant is discharged into the rotator unit and into contact with the plurality of propulsion vanes causing rotation of the rotator unit, and a rotator magnet mounted thereto, relative to a stator unit, thereby generating an amount of electrical energy.

In still one other aspect, the super-cooled propellant powered generator system may have an electrical generating orientation at least partially defined by a stator unit disposed in an at least partially surrounding relation to a rotator magnet.

In yet another aspect, the super-cooled propellant powered generator system can include a first guide member having a first superconductive material of construction.

In still one further aspect, the super-cooled propellant powered generator system may have a second guide member having a second superconductive material of construction.

In yet one other aspect, the super-cooled propellant powered generator system can include a stator unit having at least one stator winding disposed therein.

In still another aspect, the super-cooled propellant powered generator system may have a stator unit including a plurality of stator windings disposed therein.

In yet one further aspect, the super-cooled propellant powered generator system can include a rotator magnet comprising a rare earth magnet.

In still one other aspect, a super-cooled propellant powered generator for generating an amount of electrical energy driven by a super-cooled propellant may comprise: a first rotator support assembly having a first support unit with a first guide member mounted thereto, the first support unit comprises a first superconductive material of construction; a second rotator support assembly oppositely disposed from the first rotator support assembly having a second support unit with a second guide member mounted thereto, the second support unit comprises a second superconductive material of construction; a rotator assembly including a rotator unit disposed in a rotational relationship relative to the first guide member and the second guide member; the rotator unit having a plurality of propulsion vanes mounted therein; a rotator magnet assembly having a rotator magnet mounted around the rotator unit and rotational therewith; the rotator magnet assembly further comprising a first magnet mounted proximate the first open end of the rotator unit and a second magnet mounted proximate the second open end of the rotator unit; a stator assembly comprising a stator unit, wherein the stator unit comprises at least one stator winding disposed therein, the rotator magnet disposed in an electrical generating orientation relative to the stator unit; and a super-cooled propellant transmission assembly transmits the amount of the super-cooled propellant to a first super-cooling coil in the first support unit to maintain the first superconductive material of construction of the first support unit at a first operating temperature before transmitting the super-cooled propellant to and through a second super-cooling coil in the second support unit to maintain the second superconductive material of construction of the second support unit at a second operating temperature before discharging the super-cooled propellant into the rotator unit and into contact with the plurality of propulsion vanes causing rotation of the rotator unit, and the rotator magnet mounted thereto, relative to the stator unit, thereby generating the amount of electrical energy.

In yet another aspect, a super-cooled propellant powered generator for generating an amount of electrical energy driven by a super-cooled propellant may comprise: a base assembly having a base member; a first rotator support assembly having a first support unit with a first guide member attached thereto, the first support unit and the first guide member comprise a first superconductive material of construction; a second rotator support assembly oppositely disposed from the first rotator support assembly having a second support unit with a second guide member attached thereto, the second support unit and the second guide member comprise a second superconductive material of construction; one of the first rotator support assembly or the second rotator support assembly interconnected to the base member; a rotator assembly including a rotator unit disposed in a rotational relationship relative to the first guide member and the second guide member; the rotator unit having a plurality of propulsion vanes mounted therein; a rotator magnet assembly having a rotator magnet mounted around the rotator unit and rotational therewith, the rotator magnet comprising a rare earth magnet; the rotator magnet assembly further comprising a first magnet mounted proximate the first open end of the rotator unit and a second magnet mounted proximate the second open end of the rotator unit; the first superconductive material of construction of the first support unit and the first guide member exhibits a first magnetically repulsive force on the first magnet to repel the first open end of the rotator unit into a physically displaced orientation relative to the first rotator support assembly; the second superconductive material of construction of the second support unit and the second guide member exhibits a second magnetically repulsive force on the second magnet to repel the second open end of the rotator unit into a physically displaced orientation relative to the second rotator support assembly; a stator assembly comprising a stator unit, wherein the stator unit comprises a plurality of stator windings disposed therein, the rotator magnet disposed in an electrical generating orientation relative to the stator unit at least partially defined by the stator unit disposed in an at least partially surrounding relation to the rotator magnet; the base assembly further comprising a stator arm interconnected to the base member, the stator unit maintained in the at least partially surrounding relation to the rotator magnet by the stator arm; and, a super-cooled propellant transmission assembly to generate and transmit the amount of the super-cooled propellant to and through a first internal super-cooling coil in the first support unit to maintain the first superconductive material of construction of the first support unit and the first guide member at a first operating temperature; the super-cooled propellant transmission assembly then transmits the super-cooled propellant to and through a second internal super-cooling coil in the second support unit to maintain the second superconductive material of construction of the second support unit and the second guide member at a second operating temperature before discharging the super-cooled propellant through a plurality of propellant discharge nozzles though the second guide member and into the rotator unit into contact with the plurality of propulsion vanes and discharging from the rotator unit through a plurality of propellant discharge aperture causing rotation of the rotator unit, and the rotator magnet mounted thereto, relative to the stator unit, thereby generating the amount of electrical energy, wherein the super-cooled propellant comprises liquid nitrogen having an operating temperature of less than about 77 degrees Kelvin.

These and other objects, features, and advantages of the present invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "top", "bottom", "left", "right", "front", "rear", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed generally to a super-cooled propellant powered generator system to generate an amount of electrical energy.

Figure 1:
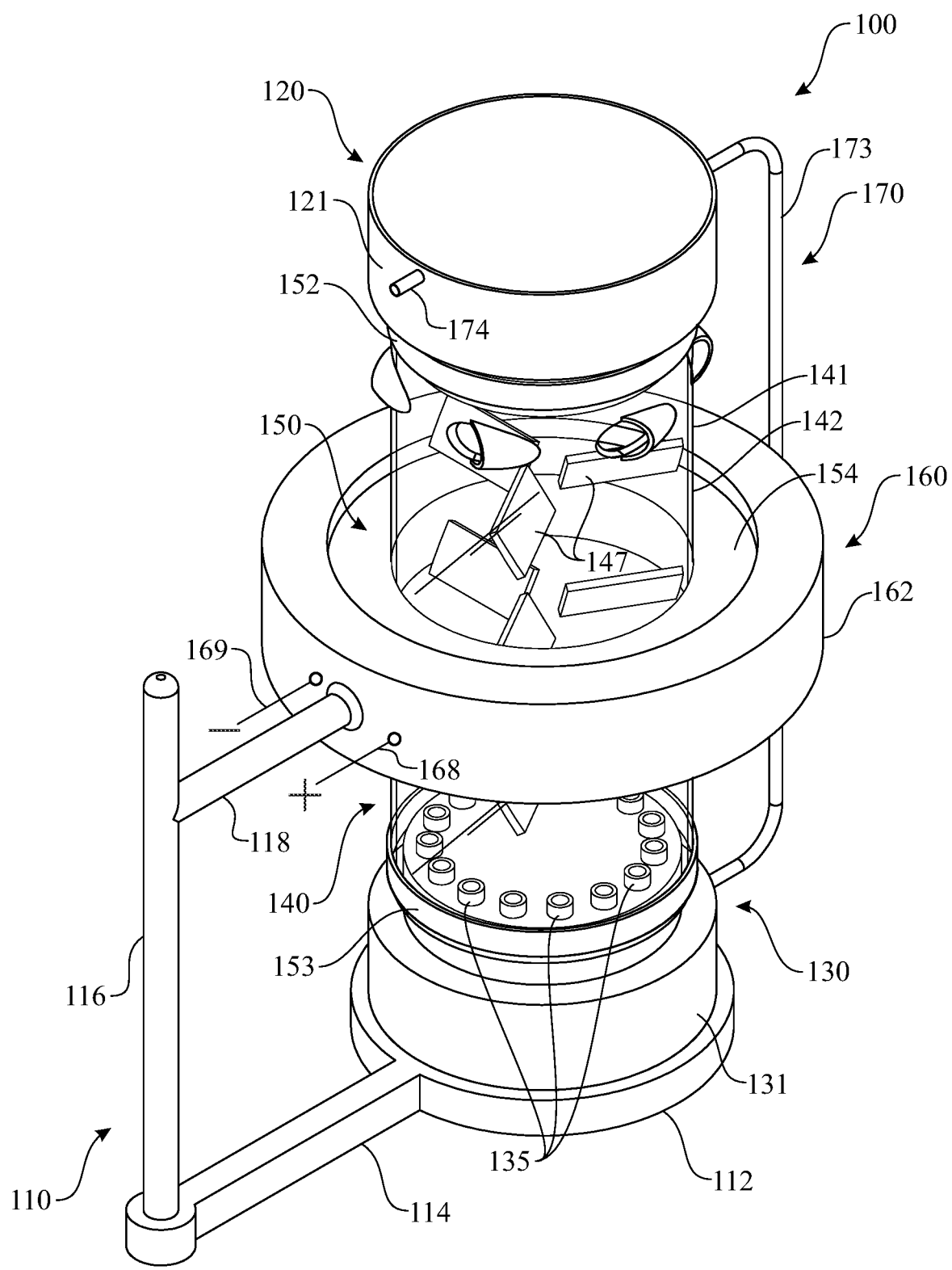
FIG. 1 presents an upper perspective view of one illustrative embodiment of a super-cooled propellant powered generator system, in accordance with the present invention.
Figure 2:
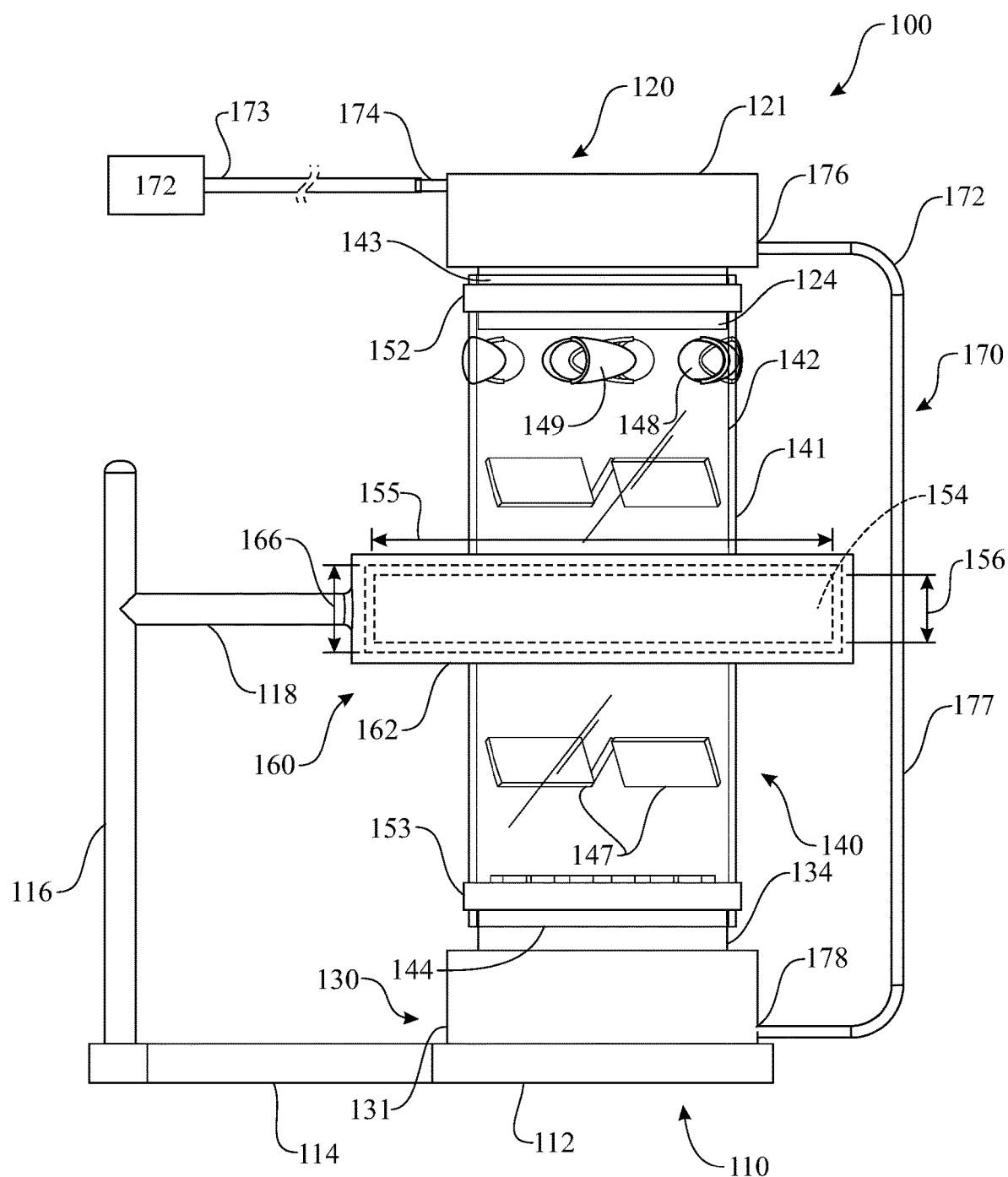
FIG. 2 presents an elevation of the super-cooled propellant powered generator system of FIG. 1, in accordance with the present invention.

Referring initially to FIGS. 1 and 2, presented therein are an upper perspective view and an elevation of one illustrative embodiment of a super-cooled propellant powered generator system, generally as shown as at 100, in accordance with the present invention. A super-cooled propellant powered generator system 100 in at least one embodiment includes a base assembly 110. With reference to FIGS. 1 and 2, a base assembly 110 includes a base member 112 having an extension arm 114 attached thereto and extending outwardly therefrom. A base assembly 110 in accordance with the present invention may include a side arm 116 attached to and extending upwardly from an extension arm 114. With reference again to FIGS. 1 and 2, in one embodiment a side arm 116 is attached to and extends upwardly from an extension arm 114, and is oppositely disposed outwardly from the base member 112 on the extension arm 114. A base assembly 110 may further include a stator arm 118 which is attached to a portion of a side arm 116. In at least one embodiment, a stator arm 118 is attached to and configured to maintain a stator unit 162 in an at least partially surrounding relation to a rotator magnet 154, as discussed in greater detail hereinafter.

It is to be appreciated that a base assembly 110 and the components thereof may be constructed from any of a variety of materials exhibiting sufficient strength and rigidity to support the present super-cooled propellant powered generator system 100. By way of example, a base assembly 110 and/or one or more of its components may be constructed of non-ferrous-metals and/or metal alloys, plastic, fiberglass, graphite, engineered composite materials, etc.

A super-cooled propellant powered generator system 100 in accordance with at least one embodiment of the present invention further comprises a first rotator support assembly 120. With reference once again to the illustrative embodiment of FIGS. 1 and 2, a first rotator support assembly 120 includes a first support unit 121. A first rotator support assembly 120 in accordance with at least one embodiment of the present invention includes a first guide member 124 mounted to a first support unit 121. A first guide member 124 in one embodiment may be separate from a first support unit 121 and attached thereto by any of a number of fastening techniques such as, by way of example only, welding, soldering, adhesives, bolts, screws, etc. In at least one further embodiment, a first guide number 124 is integrally constructed with a first support unit 121.

In at least one further embodiment, a super-cooled propellant powered generator system 100 further comprises a second rotator support assembly 130. With reference once again to FIGS. 1 and 2, and similar to a first rotator support assembly 120, a second rotator support assembly 130 comprises a second support unit 131. A second rotator support assembly 130 in accordance with at least one embodiment of the present invention includes a second guide member 134 mounted to a second support unit 131. As with the first guide member 121, a second guide member 134 in one embodiment may be separate from a second support unit 131 and attached thereto by any of a number of fastening techniques such as, by way of example only, welding, soldering, adhesives, bolts, screws, etc. In at least one further embodiment, and also similar to a first rotator support assembly 120, a second guide member 134 is integrally constructed with a second support unit 131.

As with a base assembly 100, it is to be appreciated that a first rotator support assembly 120, a second rotator support assembly 130, and/or one or more of the components thereof may be constructed from any of a variety of materials exhibiting sufficient strength and rigidity. As before, and by way of example only, a first rotator support assembly 120, a second rotator support assembly 130, and/or one or more of its components may be constructed of non-ferrous-metals and/or metal alloys, plastic, fiberglass, graphite, engineered composite materials, etc.

In at least one further embodiment, a first rotator support assembly 120, a second rotator support assembly 130, and/or one or more of the components thereof may be constructed from any of a variety of superconductive materials of construction which produce repulsive magnetic fields at temperatures below a critical temperature, the importance of which will become apparent hereinafter. As one example, one or both of a first support unit 121 and/or a second support unit 131 may be constructed of a superconductive material of construction. More in particular, in one embodiment, a first support unit 131 is constructed of a first superconductive material of construction, and in one further embodiment, a first support unit 121 and/or a first guide member 124 are constructed of a first superconductive material of construction. In at least one other embodiment, a second support unit 131 is constructed of a second superconductive material of construction, and in yet one further embodiment, a second support unit 123 and/or a second guide member 134 are constructed of a second superconductive material of construction. Is to be appreciated that in at least one embodiment a second superconductive material of construction may be the same as a first superconductive material of construction.

A first or second superconductive material of construction in accordance with at least one embodiment of the present invention may include a high-temperature superconductor from the yttrium-barium-copper-oxide ("YBCO") family of superconductors, having a critical temperature of about 90 degrees Kelvin. In at least one further embodiment, a first or second superconductive material of construction may comprise a high-temperature superconductor from the bismuth-strontium-copper-oxide ("BSCCO") family of superconductors, having a critical temperature in a range of about 30 degrees Kelvin to about 110 degrees Kelvin. Additional or alternative superconductors which may be utilized in the present invention include, among others, a Gd—Ba—Cu—O ("GdBCO") bulk superconductor or a high-temperature Hg—Ba—Ca—Cu—O ("HBCCO") superconductor. As before, the importance of a superconductive material of construction for one or more components of the present super-cooled propellant powered generator system 100 will become readily apparent hereinafter.

A super-cooled propellant powered generator system 100 in accordance with the present invention includes a rotator assembly 140. In one embodiment, a rotator assembly 140 comprises a rotator unit 141. A rotator unit 141 includes a rotator wall 142 which, in at least one embodiment, comprising a generally cylindrical configuration. Further, a rotator unit 141 in accordance with the present invention comprises a first open end 143 and a second open end 144 oppositely disposed from one another at opposite ends of the rotator wall 142. More in particular, a rotator wall 142 is at least partially defined by a rotator unit length 146 which is measured between a first open end 143 and a second open end 144 of a rotator unit 141, as shown best in the illustrative embodiment of FIG. 5. A rotator wall 142 is further defined by a rotator unit inside diameter 145 as shown by way of example in the illustrative embodiments of FIGS. 6 and 7.

A rotator assembly 140 in one embodiment comprises a rotator unit 141 which is operatively disposed between a first rotator support assembly 120 and a second rotator support assembly 130. More in particular, a first open end 143 of a rotator unit 141 is disposed in an operative orientation relative to a first guide member 124 of a first rotator support assembly 120 and a second open end 144 of a rotator unit 141 is disposed in an operative orientation relative to a second guide member 134 of a second rotator support assembly 130, such as is shown by way of example in the illustrative embodiment of FIGS. 6 and 7, respectively.

Figure 5:
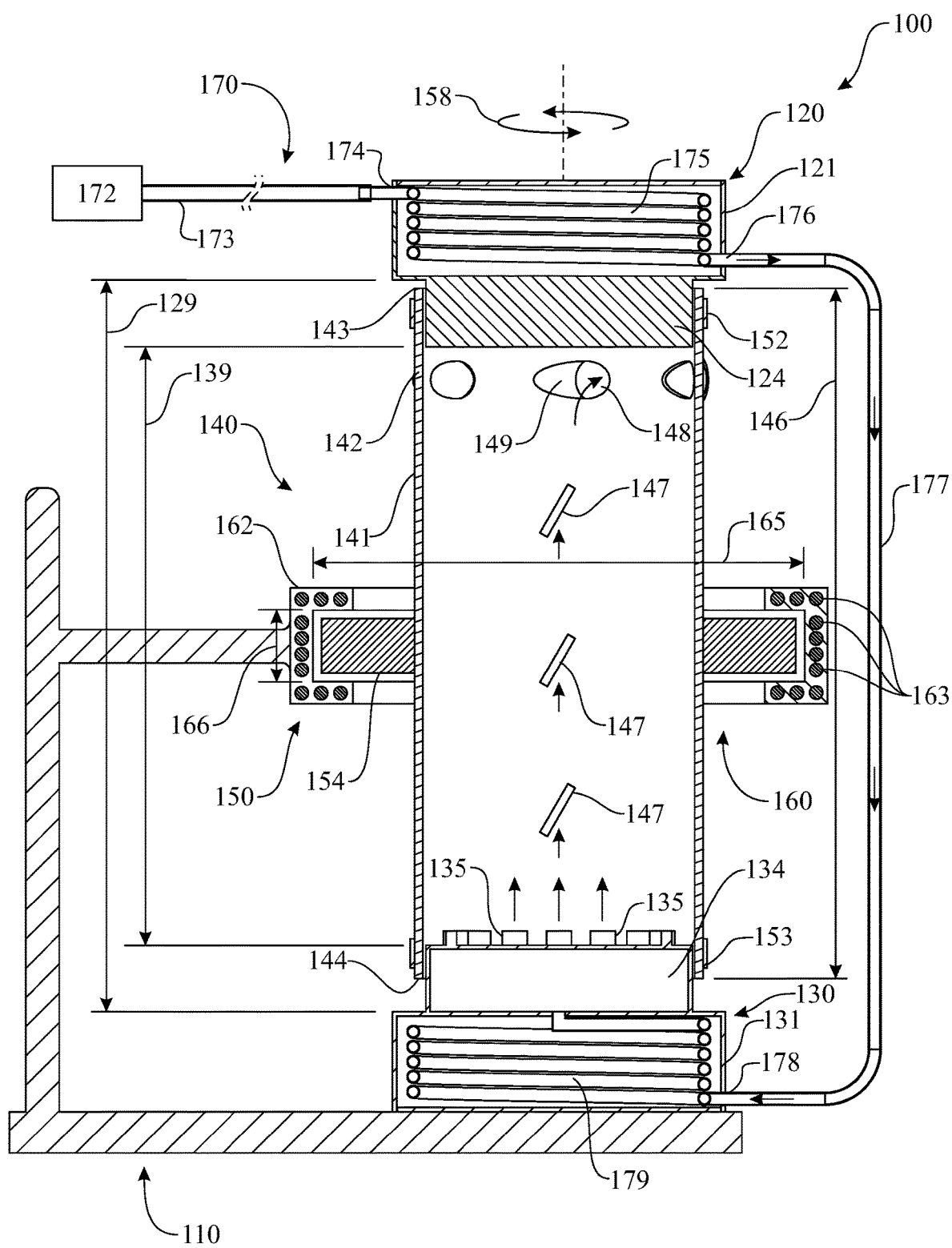
FIG. 5 presents a cross-sectional view of the super-cooled propellant powered generator system of FIG. 3 along lines 5-5 thereof, in accordance with the present invention.
Figure 6:
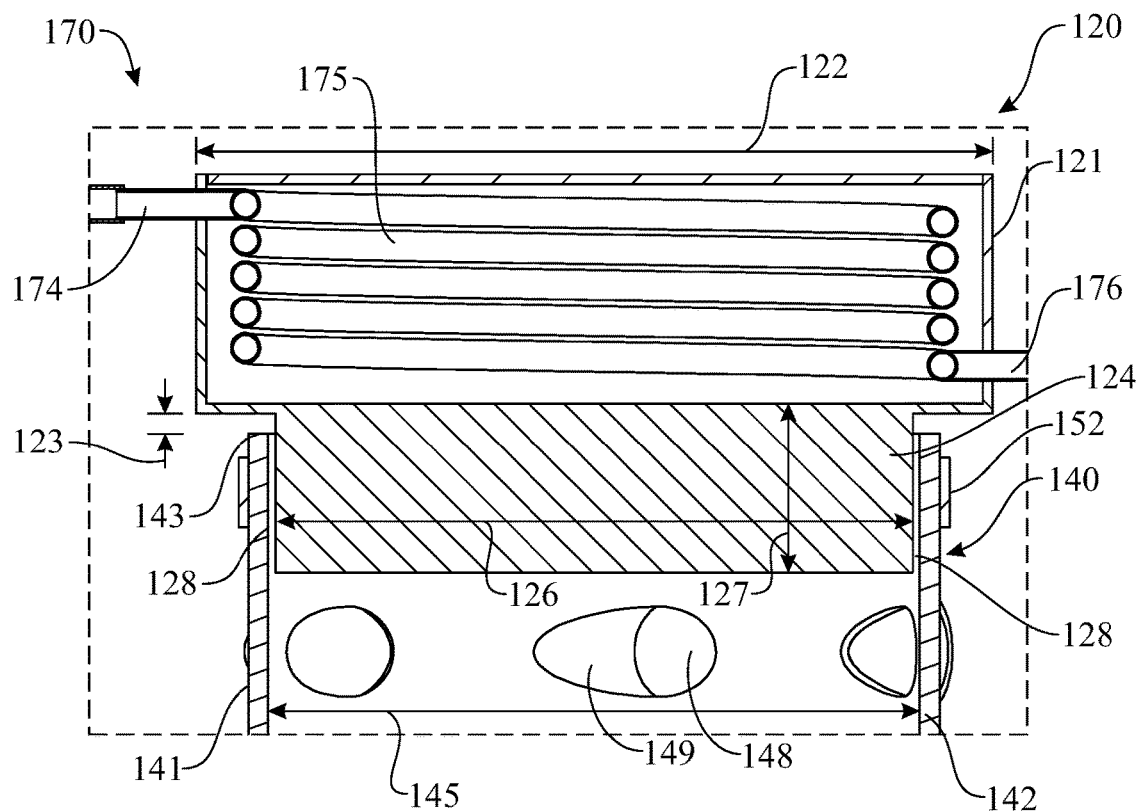
FIG. 6 presents an enlarged upper portion of the cross-sectional view of the super-cooled propellant powered generator system of FIG. 5, in accordance with the present invention.

More in particular, and looking initially to FIG. 6, a first open and 143 of a rotator unit 141 is positioned over and around a first guide member 124 of the first rotator support assembly 120. Importantly, and as shown in FIG. 6, while the first open end 143 of the rotator unit 141 is disposed in an operative orientation relative to the first guide member 124, the first open end 143 is displaced from physical contact with the first support unit 121 by a distance identified as a first support unit displacement 123, which is made possible by the fact that the distance between the first support unit 121 and the second support unit 131, identified as a support unit gap 129 in FIG. 5, is greater than a rotator unit length 146, also as shown in FIG. 5. Similarly, and as further shown in FIG. 6, while the first open end 143 of the rotator unit 141 is disposed in an operative orientation relative to the first guide member 124, the first open end 143 is offset from any physical contact with the first guide member 124 by a distance identified as a first guide member clearance 128. As will be appreciated, this is possible because the rotator unit inside diameter 145 is greater than the first guide member diameter 126, as shown best in FIG. 6.

Figure 7:
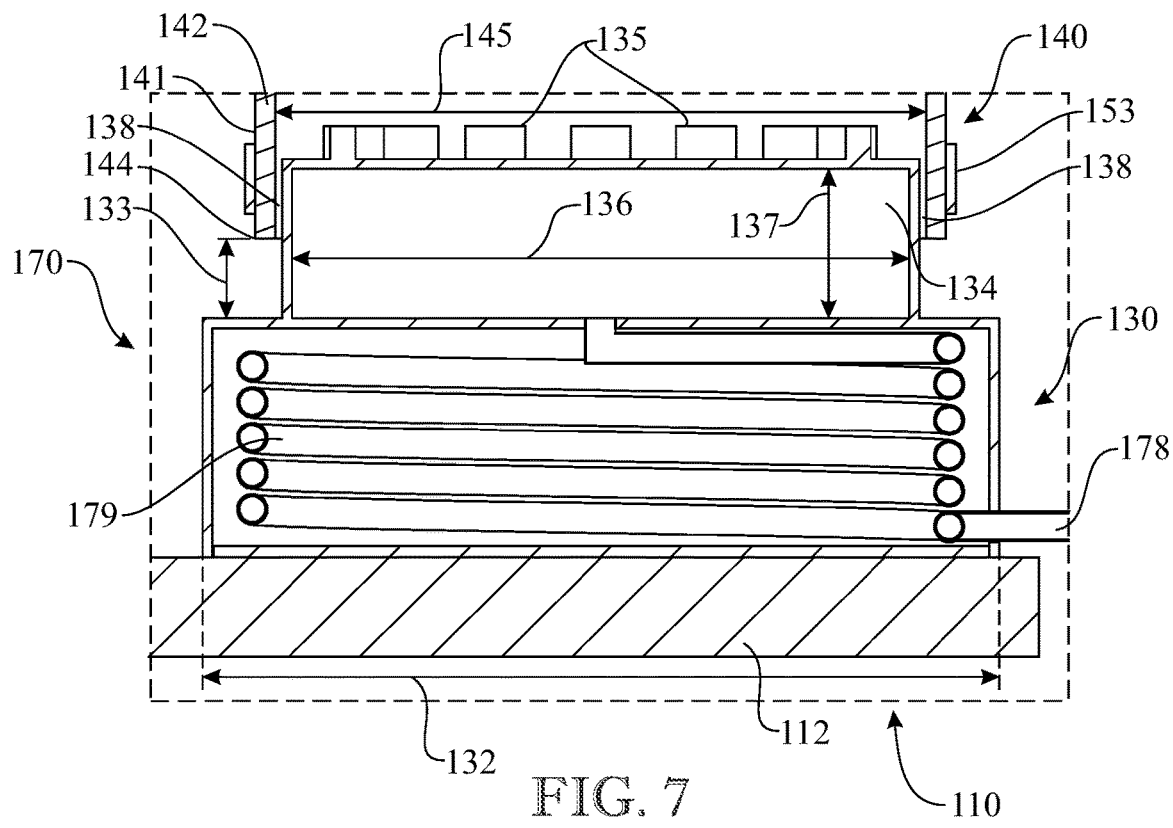
FIG. 7 presents an enlarged lower portion of the cross-sectional view of the super-cooled propellant powered generator system of FIG. 5, in accordance with the present invention.

Looking next to FIG. 7, a second open and 144 of a rotator unit 141 is positioned over and around a second guide member 134 of the second rotator support assembly 130. Importantly, once again, and as shown in FIG. 7, while the second open end 144 of the rotator unit 141 is disposed in an operative orientation relative to the second guide member 134, the second open end 144 is displaced from physical contact with the second support unit 131 by a distance identified as a second support unit displacement 133, which, as before, is made possible by the fact that the distance between the first support unit 121 and the second support unit 131, i.e., the support unit gap 129, is greater than a rotator unit length 146, once again, as shown in FIG. 5. Similarly, and as further shown in FIG. 7, while the second open end 144 of the rotator unit 141 is disposed in an operative orientation relative to the second guide member 134, the second open end 144 is offset from any physical contact with the second guide member 134 by a distance identified as a second guide member clearance 138. As will be appreciated, this is possible because the rotator unit inside diameter 145 is greater than the second guide member diameter 136, as shown best in FIG. 7.

As is apparent from the foregoing, while a rotator unit 141 is operatively disposed between a first rotator support assembly 120 and a second rotator support assembly 130, and more in particular, while a first open end 143 of a rotator unit 141 is disposed in an operative orientation relative to a first guide member 124 of a first rotator support assembly 120 and a second open end 144 of a rotator unit 141 is disposed in an operative orientation relative to a second guide member 134 of a second rotator support assembly 130, the rotator unit 141 make no physical contact with either the first rotator support assembly 120 or the second rotator support assembly 130, or any other component of a super-cooled propellant powered generator system 100 in accordance with the present invention. The importance of this operative orientation of the rotator unit 141 will become abundantly clear hereinafter.

A rotator assembly 140 in accordance with the present invention further comprises at least one propulsion vane 147 mounted along an inside surface of a rotator wall 142 of a rotator unit 141. In one embodiment, at least one propulsion vane 147 may comprise any of a variety of geometrical configurations and is oriented within the rotator unit 141 such that an amount of a super-cooled propellant discharged into the rotator unit 141 impinges thereupon and causes rotation of the rotator unit 141. In one further embodiment, a rotator assembly 140 comprises a plurality of propulsion vanes 147 mounted along the inside surface of the rotator wall 142 each positioned such that an amount of a super-cooled propellant discharged into the rotator unit 141 impinges upon each, thereby causing rotation of the rotator unit 141. More in particular, the plurality of propulsion vanes 147 are oriented within the rotator unit 141 such that the amount of super-cooled propellant discharged into the rotator unit 141 impinges upon each, such as is represented by propellant flow arrows 180 in the illustrative embodiment of FIG. 5, thereby causing rotation of the rotator unit 141 relative to a first guide member 124 of a first rotator support assembly 120 and a second guide member 134 of a second rotator support assembly 130, such as is represented diagrammatically by rotational arrow 182 in FIG. 5. While shown disposed in a vertically aligned orientation relative to one another in FIG. 5, it is within the scope and intent of the present invention for a plurality of propulsion vanes 147 to be positioned in various other arrangement relative to one another along the inside surface of the rotator wall 142.

Figure 4:
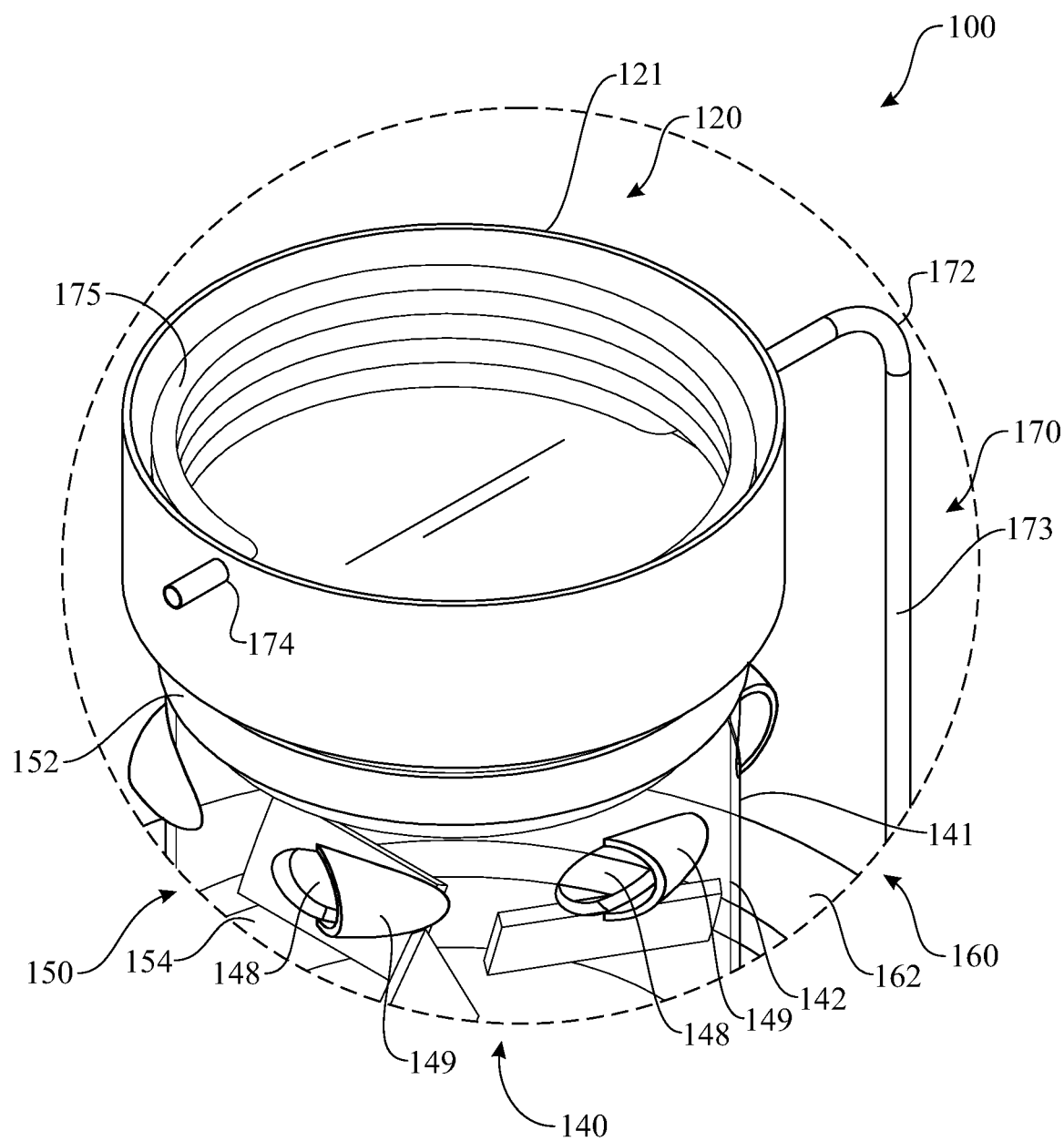
FIG. 4 presents a partial cutaway upper perspective view of the super-cooled propellant powered generator system of FIG. 1, in accordance with the present invention.

A rotator unit 141 in accordance with the present invention further comprises at least one propellant discharge aperture 148 dimensioned and configured to permit an amount of super-cooled propellant discharged into the rotator unit 141 to escape therefrom. As further shown throughout the figures, a rotator unit 141 in accordance with at least one embodiment of the present invention comprises a plurality of propellant discharge apertures 148. With reference to FIG. 4, in at least one embodiment, a plurality of propellant discharge apertures 148 are formed through the rotator wall 142 of the rotator unit 141, each dimensioned and configured to permit an amount of super-cooled propellant discharged into the rotator unit 141 to escape therethrough. As further shown in FIG. 4, each of the plurality of propellant discharge apertures 148 are positioned proximate the first open end 143 of the rotator unit 141 proximate the first rotator support assembly 120. In one further embodiment, and as also shown in FIG. 4, a rotator unit 141 comprises a plurality of propellant discharge shrouds 149, each disposed in an overlying relation to a corresponding one of a plurality of propellant discharge apertures 148. In at least one further embodiment, a propellant discharge shroud 149 is dimensioned and configured to direct an amount of expanded super-cooled propellant discharged through a corresponding propellant discharge aperture 148 in a direction counter to a rotational direction of the rotator unit 141, thereby further driving the rotation thereof, once again, as illustrated by rotational arrow 182 in FIG. 5.

A rotator assembly 140, and in particular, a rotator wall 142 of a rotator unit 141 in accordance with the present invention may be constructed of any of a variety of materials comprising sufficient strength and rigidity to operate in the manner disclosed hereinafter. In at least one embodiment, a rotator unit 141 and/or components thereof, such as a rotator wall 142 and/or propulsion vanes 147, are constructed of a non-ferrous material, for reasons which will become apparent, such as, by way of example only, ceramic, fiberglass, glass, graphite and graphite composites, plastic, non-ferrous metals including but not limited to aluminum, nickel, lead, tin, brass, silver, and zinc, just to name a few.

A super-cooled propellant powered generator system 100 in accordance with the present invention also includes a rotator magnet assembly 150. More in particular, and with reference once again to FIG. 2, a rotator magnet assembly 150 in at least one embodiment includes a first magnet 152 which is attached to a rotator wall 142 of a rotator unit 141 proximate a first open end 143 thereof. With continued reference to FIG. 2, in one further embodiment a rotator magnet assembly 150 comprises a second magnet 153 attached to the rotator wall 142 of the rotator unit 141 proximate a second open end 144 thereof.

A rotator magnet assembly 150 in accordance with the present invention further comprises a rotator magnet 154. As may be seen from the illustrative embodiment of FIG. 1, a rotator magnet 154 is mounted to a rotator wall 142 of a rotator unit 141. More importantly, a rotator magnet 154 is mounted to a rotator wall 142 of a rotator unit 141 so as to be rotational therewith. A rotator magnet 154 in at least one embodiment of the present invention comprises a rare earth magnet. A rotator magnet 154 in one embodiment may comprise a plurality of smaller rare earth magnets with opposing poles disposed end to end and arranged so as to encircle a portion of a rotator wall 142 of a rotator unit 141. In yet one further embodiment, a rotator magnet 154 is encased in a magnetically transmissive sleeve or housing. In still another embodiment, one or both of a first magnet 152 and/or a second magnet 153 also comprise rare earth magnets.

In accordance with the present super-cooled propellant powered generator system 100 also includes a stator assembly 160. In at least one embodiment, a super-cooled propellant powered generator system 100 includes a stator assembly 160 disposed in an operative orientation relative to a rotator magnet assembly 150. More in particular, in one embodiment, a super-cooled propellant powered generator system 100 includes a stator assembly 160 comprising a stator unit 162 disposed in an operative electrical generating orientation relative to a rotator magnet 154 of a rotator magnet assembly 150, as shown in FIG. 1 and as is discussed in further detail hereinafter.

Figure 3:
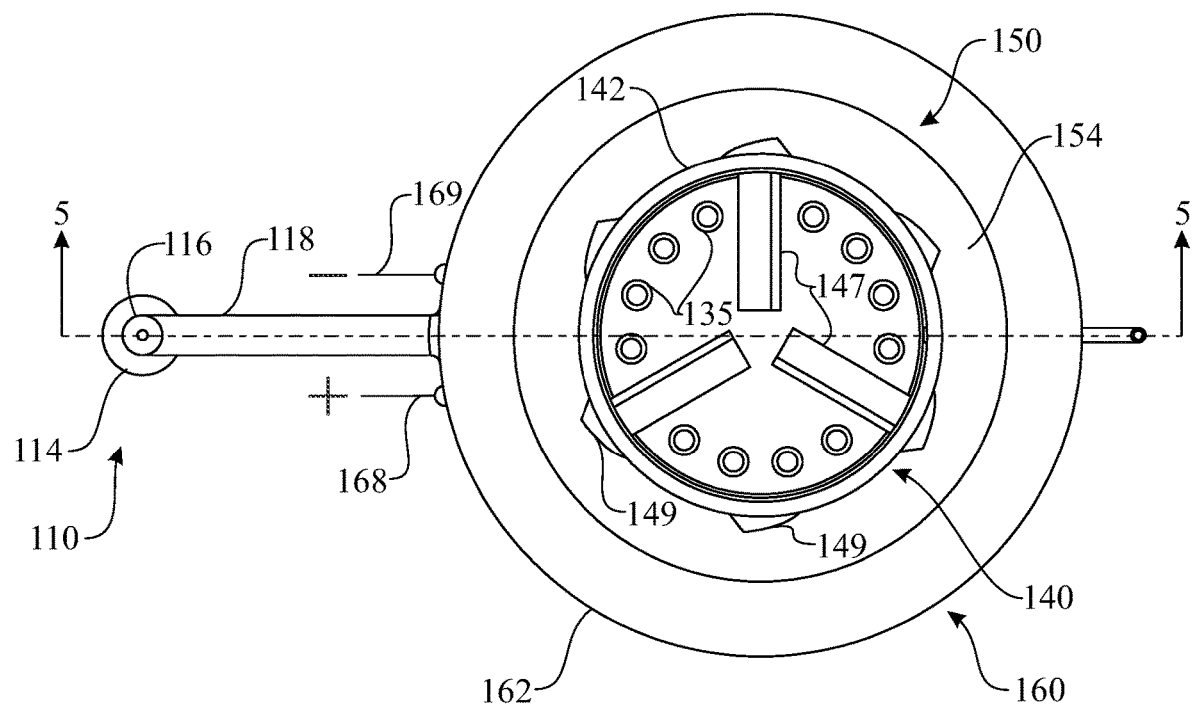
FIG. 3 presents a partial cutaway top plan view of the super-cooled propellant powered generator system of FIG. 1, in accordance with the present invention.

In at least one embodiment, a stator unit 162 of a stator assembly 160 comprises at least one stator winding 163, wherein the stator winding 163 of the stator unit 162 is positioned proximate the rotator magnet 154 of the rotator magnet assembly 150, and more in particular, proximate a magnetic flux field created by rotation of the rotator magnet 154 which rotates with the rotator unit 141 proximate the stator unit 162, thereby generating electricity. In at least one further embodiment, a stator unit 162 of a stator assembly 160 comprises a plurality of stator windings 163, wherein each of the plurality of stator windings 163 of the stator unit 162 are positioned proximate the rotator magnet 154 and the magnetic flux field created by rotation of the rotator magnet 154 with the rotator unit 141 proximate the stator unit 162, thereby generating electricity. As seen best in FIGS. 1 and 3, a stator assembly 160 in one embodiment includes a positive stator discharge lead 168 and a negative stator discharge lead 169, to allow usable amounts of electricity to be withdrawn from the stator unit 162 while the present super-cooled propellant powered generator system 100 is in operation, as is described in detail below.

A super-cooled propellant transmission assembly 170 is provided in accordance with at least one embodiment of the present invention to transmit a super-cooled propellant from a super-cooled propellant supply 172 to and through the present super-cooled propellant powered generator system 100 via one or more super-cooled propellant transmission line 173. A super-cooled propellant transmission line 173 may be constructed from any of a number of materials of construction provided it can withstand the super-cooled operating temperatures, e.g., about 50 degrees Kelvin to about 100 degrees Kelvin, and elevated operating pressures, e.g., about 1 bar to about 170 bar, dependent on various factors, such as, the diameter of the transmission line 173, of the particular super-cooled propellant utilized in accordance with the present invention. In at least one embodiment, a super-cooled propellant powered generator system 100 utilizes liquid nitrogen as a super-cooled propellant operating at a temperature of about 90 degrees Kelvin at an operating pressure of about 1 bar to about 170 bar, once again, dependent on various factors, such as, the diameter of the transmission line 173. As will be appreciated, nitrogen is abundantly available, safe, reusable and non-polluting, making it an ideal propellant for use with the present system 100.

With reference to FIGS. 1 and 2, a super-cooled propellant transmission assembly 170 includes a super-cooled propellant supply 172 disposed in a fluid transmitting orientation with a first rotator support assembly 120 via a super-cooled propellant transmission line 173. As shown throughout the figures, a first rotator support assembly 120 includes a first propellant inlet 174 to allow an amount of super-cooled propellant to enter the first rotator support assembly 120. In addition, a first rotator support assembly 120 includes a first propellant outlet 176 to allow the amount of super-cooled propellant to exit the first rotator support assembly 120. A super-cooled propellant transmission assembly 170 also includes a first cooling coil 175 disposed in or around at least a first support unit 121 of a first rotator support assembly 120. With reference to the illustrative embodiment of FIG. 6, a super-cooled propellant transmission assembly 170 includes a first cooling coil 175 disposed inside of the first support unit 121 of the first rotator support assembly 120. As shown throughout the figures, the first support unit 121 comprises a generally hollow configuration, however, it is to be appreciated that a first support unit 121 may comprise a substantially solid or semi-solid construction. In at least one embodiment, a first cooling coil 175 is formed integrally through a solid portion of a first superconductive material of construction of a first support unit 121 in accordance with the present invention. As will be appreciated, transmission of an amount of super-cooled propellant through a first cooling coil 175 acts to reduce an operating temperature of a first superconductive material of construction of a first support unit 121 to below a critical temperature, such the first superconductive material of construction produces a repulsive magnetic field proximate the first support unit 121 and the first guide member 124 mounted thereto. Importantly, the repulsive magnetic field proximate the first support unit 121 and the first guide member 124 maintains the rotator unit 141, and more in particular, the first open end 143 of the rotator unit 141, disposed in an operative and physically detached orientation relative to the first rotator support assembly 120 and the components thereof, such as is shown best in the illustrative embodiment of FIG. 6, while the present super-cooled propellant powered generator system 100 is in operation.

After exiting the first support unit 121, the amount of super-cooled propellant is transmitted to a second propellant inlet 178 of a second support unit 131 via an interconnect propellant line 177, as shown best in FIGS. 2 and 5. In at least one embodiment, a super-cooled propellant transmission assembly 170 also includes a second cooling coil 179 disposed in or around at least a second support unit 131 of a second rotator support assembly 130. With reference once again to the illustrative embodiment of FIG. 7, the super-cooled propellant transmission assembly 170 includes a second cooling coil 179 disposed inside of the second support unit 131 of the second rotator support assembly 130. As shown throughout the figures, the second support unit 131 comprises a generally hollow configuration, however, and as before with reference to a first support unit 121, it is to be appreciated that a second support unit 131 may comprise a substantially solid or semi-solid construction. In at least one embodiment, a second cooling coil 179 may be formed integrally through a solid portion of a second superconductive material of construction of a second support unit 131 in accordance with the present invention. As will once again be appreciated, transmission of an amount of super-cooled propellant through a second cooling coil 179 acts to reduce an operating temperature of a second superconductive material of construction of a second support unit 131 to below a critical temperature, such the second superconductive material of construction produces a repulsive magnetic field proximate the second support unit 131 and the second guide member 134 mounted thereto. Importantly, and as before, the repulsive magnetic field proximate the second support unit 131 and the second guide member 134 maintains the rotator unit 141, and more in particular, the second open end 144 of the rotator unit 141, disposed in an operative and physically detached orientation relative to the second rotator support assembly 130 and the components thereof, such as is shown best in the illustrative embodiment of FIG. 7, while the present super-cooled propellant powered generator system 100 is in operation.

With reference next to FIG. 5, after passing through a second cooling coil 179, the amount of super-cooled propellant is discharged into a second guide member 134 and out through each of a plurality of propellant discharge nozzles 135 formed through an upper portion of the second guide member 134, wherein the amount of super-cooled propellant rapidly expands and increases in velocity upward into and through the rotator unit 141 into contact with the plurality of propulsion veins 147 disposed along the inner surfaces thereof, thereby causing rapid rotation of the rotator unit 141 and, more importantly, the rotator magnet 154 mounted therearound.

As will be appreciated, rotation of a rotator magnet 154 with the rotator unit 141, caused by the expanded propellant contacting the plurality of propulsion vanes 147, while the rotator magnet 154 is disposed in an operative electrical generating orientation relative to a stator unit 162, and more in particular, to a plurality of stator windings 163 therein, results in the generation of an amount of electrical energy while the present super-cooled propellant powered generator system 100 is in operation. As will be further appreciated, by virtue of the repulsive magnetic fields created proximate a first rotator support assembly 120, via a first superconductive material of construction operating below a critical temperature, and proximate a second rotator support assembly 130, via a second superconductive material of construction operating below a critical temperature, the rotator unit 141 is operatively disposed therebetween in a physically detached orientation from both the first rotator support assembly 120 and the second rotator support assembly 130, as shown best in FIGS. 2 and 5, thereby eliminating the frictional losses which would otherwise result from such contact, thus substantially increasing the efficiency of the present super-cooled propellant powered generator system 100. As will also be appreciated by those of skill in the art, the present super-cooled propellant powered generator system 100 is readily scalable for use to meet personal, commercial, and/or municipal electricity generating requirements.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A super-cooled propellant powered generator system for generating an amount of electrical energy driven by a super-cooled propellant, said system comprising:
a first rotator support assembly having a first support unit with a first guide member attached thereto;
a second rotator support assembly oppositely disposed from said first rotator support assembly having a second support unit with a second guide member attached thereto;
a rotator assembly including a rotator unit disposed in a rotational relationship relative to said first guide member and said second guide member;
said rotator unit having at least one propulsion vane mounted therein;
a rotator magnet assembly having a rotator magnet mounted around said rotator unit and rotational therewith;
a stator assembly comprising a stator unit, said rotator magnet disposed in an electrical generating orientation relative to said stator unit; and
a super-cooled propellant transmission assembly transmits an amount of super-cooled propellant to at least said second support unit via a super-cooled propellant transmission line before discharging the amount of super-cooled propellant through said second guide member into said rotator unit and into contact with said at least one propulsion vane causing rotation of said rotator unit, and said rotator magnet mounted thereto, relative to said stator unit, thereby generating the amount of electrical energy.

2. The system as recited in claim 1, wherein said first support unit comprises a first superconductive material of construction.

3. The system as recited in claim 2, wherein said rotator magnet assembly comprises a first magnet mounted proximate a first open end of said rotator unit.

4. The system as recited in claim 3, wherein said super-cooled propellant transmission assembly transmits the amount of super-cooled propellant through a first cooling coil in said first support unit to maintain said first superconductive material of construction of said first support unit at a first operating temperature before transmitting the amount of super-cooled propellant to said second support unit.

5. The system as recited in claim 4, wherein said first superconductive material of construction of said first support unit exhibits a first magnetically repulsive force on said first magnet to repel said first open end of said rotator unit into a physically displaced orientation relative to said first rotator support assembly.

6. The system as recited in claim 1, wherein said second support unit comprises a second superconductive material of construction.

7. The system as recited in claim 6, wherein said rotator magnet assembly comprises a second magnet mounted proximate a second open end of said rotator unit.

8. The system as recited in claim 7, wherein said super-cooled propellant transmission assembly transmits the amount of super-cooled propellant through a second cooling coil in said second support unit to maintain said second superconductive material of construction of said second support unit at a second operating temperature before discharging the amount of super-cooled propellant into said rotator unit into contact with said at least one propulsion vane.

9. The system as recited in claim 8, wherein said second superconductive material of construction of said second support unit exhibits a second magnetically repulsive force on said second magnet to repel said second open end of said rotator unit into a physically displaced orientation relative to said second rotator support assembly.

10. The system as recited in claim 1, wherein said rotator unit comprises a plurality of propulsion vanes mounted therein and the amount of super-cooled propellant is discharged into said rotator unit and into contact with said plurality of propulsion vanes causing rotation of said rotator unit, and said rotator magnet mounted thereto, relative to said stator unit, thereby generating the amount of electrical energy.

11. The system as recited in claim 1, wherein said electrical generating orientation is at least partially defined by said stator unit disposed in an at least partially surrounding relation to said rotator magnet.

12. The system as recited in claim 1, wherein said first guide member comprises a first superconductive material of construction.

13. The system as recited in claim 1, wherein said second guide member comprises a second superconductive material of construction.

14. The system as recited in claim 1, wherein said stator unit comprises at least one stator winding disposed therein.

15. The system as recited in claim 1, wherein said stator unit comprises a plurality of stator windings disposed therein.

16. The system as recited in claim 1, wherein said rotator magnet comprises a rare earth magnet.

17. A super-cooled propellant powered generator system for generating an amount of electrical energy driven via a super-cooled propellant, said system comprising:
   a first rotator support assembly having a first support unit with a first guide member mounted thereto, said first support unit comprises a first superconductive material of construction;
   a second rotator support assembly oppositely disposed from said first rotator support assembly having a second support unit with a second guide member mounted thereto, said second support unit comprises a second superconductive material of construction;
   a rotator assembly including a rotator unit disposed in a rotational relationship relative to said first guide member and said second guide member;
   said rotator unit having a plurality of propulsion vanes mounted therein;
   a rotator magnet assembly having a rotator magnet mounted around said rotator unit and rotational therewith;
   said rotator magnet assembly further comprising a first magnet mounted proximate said a first open end of said rotator unit and a second magnet mounted proximate said-second-a second open end of said rotator unit;
   a stator assembly comprising a stator unit, wherein said stator unit comprises at least one stator winding disposed therein, said rotator magnet disposed in an electrical generating orientation relative to said stator unit; and
   a super-cooled propellant transmission assembly transmits an amount of super-cooled propellant to a first cooling coil in said first support unit to maintain said first superconductive material of construction of said first support unit at a first operating temperature before transmitting the amount of super-cooled propellant to and through a second cooling coil in said second support unit to maintain said second superconductive material of construction of said second support unit at a second operating temperature before discharging the amount of super-cooled propellant into said rotator unit and into contact with said plurality of propulsion vanes causing rotation of said rotator unit, and said rotator magnet mounted thereto, relative to said stator unit, thereby generating the amount of electrical energy.

18. The system as recited in claim 17, wherein said first superconductive material of construction of said first support unit exhibits a first magnetically repulsive force on said first magnet to repel said first open end of said rotator unit into a physically displaced orientation relative to said first rotator support assembly.

19. The system as recited in claim 17, wherein said second superconductive material of construction of said second support unit exhibits a second magnetically repulsive force on said second magnet to repel said second open end of said rotator unit into a physically displaced orientation relative to said second rotator support assembly.

20. A super-cooled propellant powered generator system for generating an amount of electrical energy driven via a super-cooled propellant, said system comprising:
   a base assembly having a base member;
   a first rotator support assembly having a first support unit with a first guide member attached thereto, said first support unit and said first guide member comprise a first superconductive material of construction;
   a second rotator support assembly oppositely disposed from said first rotator support assembly having a second support unit with a second guide member attached thereto, said second support unit and said second guide member comprise a second superconductive material of construction;
   one of said first rotator support assembly or said second rotator support assembly interconnected to said base member;
   a rotator assembly including a rotator unit disposed in a rotational relationship relative to said first guide member and said second guide member;
   said rotator unit having a plurality of propulsion vanes mounted therein;
   a rotator magnet assembly having a rotator magnet mounted around said rotator unit and rotational therewith, said rotator magnet comprising a rare earth magnet;
   said rotator magnet assembly further comprising a first magnet mounted proximate said a first open end of said rotator unit and a second magnet mounted proximate a second open end of said rotator unit;
   said first superconductive material of construction of said first support unit exhibits a first magnetically repulsive force on said first magnet to repel said first open end of said rotator unit into a physically displaced orientation relative to said first rotator support assembly;
   said second superconductive material of construction of said second support unit exhibits a second magnetically repulsive force on said second magnet to repel said second open end of said rotator unit into a physically displaced orientation relative to said second rotator support assembly;
   a stator assembly comprising a stator unit, wherein said stator unit comprises a plurality of stator windings disposed therein, said rotator magnet disposed in an electrical generating orientation relative to said stator unit at least partially defined by said stator unit disposed in an at least partially surrounding relation to said rotator magnet;
   said base assembly further comprising a stator arm interconnected to said base member,
   said stator unit maintained in said at least partially surrounding relation to said rotator magnet by said stator arm;
   a super-cooled propellant transmission assembly generates and transmits the amount amount of super-cooled propellant to and through a first internal cooling coil in said first support unit to maintain said first superconductive material of construction of said first support unit and said first guide member at a first operating temperature; and said super-cooled propellant transmission assembly then transmits the amount of supercooled propellant to and through a second internal cooling coil in said second support unit to maintain said second superconductive material of construction of said second support unit and said second guide member at a second operating temperature before discharging the amount of super-cooled propellant through a plurality of propellant discharge nozzles though said second guide member and into said rotator unit into contact with said plurality of propulsion vanes causing rotation of said rotator unit, and said rotator magnet mounted thereto, relative to said stator unit, thereby generating the amount of electrical energy.

\* \* \* \* \*